(12) United States Patent
Plante et al.

(10) Patent No.: US 7,404,608 B2
(45) Date of Patent: Jul. 29, 2008

(54) TRACKED SUSPENSION BEAM ASSEMBLY

(75) Inventors: Sean M. Plante, Clearwater, KS (US); Edward Wagner, Wichita, KS (US)

(73) Assignee: CNH America LLC, New Holland, PA (US)

( * ) Notice: Subject to any disclaimer, the term of this patent is extended or adjusted under 35 U.S.C. 154(b) by 136 days.

(21) Appl. No.: 11/337,292

(22) Filed: Jan. 23, 2006

(65) Prior Publication Data

US 2007/0170777 A1    Jul. 26, 2007

(51) Int. Cl.
B62D 55/10    (2006.01)
B62D 55/088    (2006.01)

(52) U.S. Cl. ........................... 305/130; 305/108

(58) Field of Classification Search ............ 305/100, 305/107, 108, 124, 129, 130, 138, 142; 180/9.5, 180/9.56
See application file for complete search history.

(56) References Cited

U.S. PATENT DOCUMENTS

| | | | |
|---|---|---|---|
| 994,317 A | 6/1911 | Holt | |
| 1,275,344 A | 8/1918 | White | |
| 1,365,937 A | 1/1921 | Morgan et al. | |
| 1,427,542 A | 8/1922 | Morton | |
| 1,503,597 A * | 8/1924 | Norelius | 180/9.6 |
| 1,512,152 A | 10/1924 | White | |
| 1,571,628 A * | 2/1926 | Hendrickson | 305/138 |
| 1,660,103 A | 2/1928 | Smyth | |
| 1,697,970 A | 1/1929 | Decker | |
| 1,992,702 A | 2/1935 | Koop | |
| 2,284,821 A * | 6/1942 | Heaslet | 305/154 |
| 3,336,087 A * | 8/1967 | Reinsma | 305/109 |
| 3,938,605 A | 2/1976 | Koch | |
| 3,960,230 A * | 6/1976 | Van Wuytswinkel | 180/9.62 |
| 4,083,610 A | 4/1978 | Kurchowski | |
| 5,226,703 A * | 7/1993 | Norman | 305/110 |
| 6,209,669 B1 * | 4/2001 | Young | 180/9.52 |
| 6,267,458 B1 * | 7/2001 | Hansen et al. | 305/107 |
| 6,322,171 B1 | 11/2001 | Fornes | |
| 6,394,204 B1 * | 5/2002 | Haringer | 180/9.52 |
| 6,832,659 B1 * | 12/2004 | Bares et al. | 180/9.22 |
| 7,066,289 B2 * | 6/2006 | Fujita et al. | 180/9.1 |
| 7,231,993 B2 * | 6/2007 | Albright et al. | 180/9.5 |
| 2006/0097571 A1 * | 5/2006 | Fornes | 305/145 |

* cited by examiner

*Primary Examiner*—Russell D. Stormer
*Assistant Examiner*—Kip T Kotter
(74) *Attorney, Agent, or Firm*—Michael G. Harms; John William Stader; Patrick M. Sheldrake

(57) ABSTRACT

An elongated beam assembly for a tracked suspension includes an inverted "U" shaped member having a first upper surface disposed at an outwardly descending lateral angle; and a plurality of track wheels coupled to the bottom of the member and disposed inside the member. In another arrangement the assembly includes a curved plate disposed between and fixed to both an inner wall and outer wall of the "U" shaped member, with the free edge of the curved plate extending outward over the top edge of the outer wall.

15 Claims, 3 Drawing Sheets

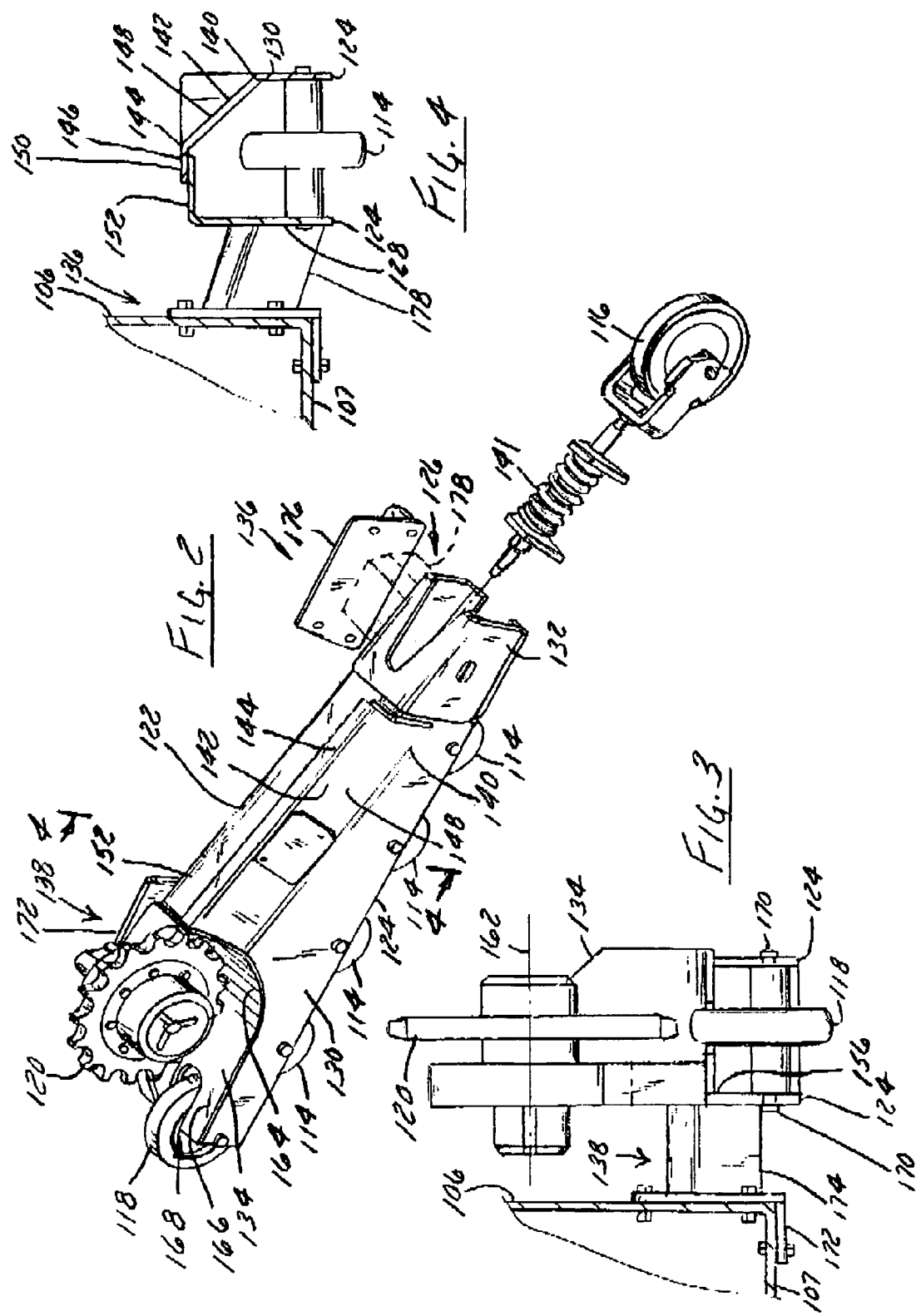

TRACKED SUSPENSION BEAM ASSEMBLY

FIELD OF THE INVENTION

The present invention relates generally to vehicles having tracked suspensions. More particularly it relates to the construction of tracked suspension beams.

BACKGROUND OF THE INVENTION

Tracked vehicles are typically designed to operate in fields and construction sites. In these environments dirt and rocks are often churned up and deposited on suspension components. This can clog the tracks, jam suspension components and cause excessive wear, among other problems. What is needed is a suspension that can better shed dirt and other contaminants. It is an object of this invention to provide such a suspension assembly.

SUMMARY OF THE INVENTION

In accordance with a first aspect of the invention, an elongated beam assembly for a tracked suspension is provided, comprising an inverted "U" shaped member having a first upper surface disposed at an outwardly descending lateral angle; and a plurality of track wheels coupled to the bottom of the member and disposed inside the member.

In accordance with a second aspect of the invention, an elongated beam assembly for a tracked suspension is provided, comprising an inner wall and an outer wall coupled together to form an inverted "U" shaped member that is configured to support a plurality of track wheels; a curved plate having a bottom surface, wherein said curved plate is disposed between and fixed to both the inner wall and outer wall, wherein a free edge of the top plate extends laterally outward over the top edge of the outer wall, and further wherein the bottom surface of the curved plate is welded to the to the edge of the outer wall; and a plurality of track wheels coupled to the bottom of the member and disposed inside the member.

BRIEF DESCRIPTION OF THE DRAWINGS

Other objects and a more complete understanding of the present invention may be had by referring to the following specification taken in conjunction with the accompanying drawings in which:

FIG. 2 is a front perspective exploded view of the right suspension beam assembly of the tractor of FIG. 1 with the track removed.

FIG. 3 is a rear view of the suspension beam assembly of FIGS. 1-2, showing a fragmentary cross section of the chassis of the tractor of FIG. 1.

FIG. 4 is a rear cross sectional view of the suspension beam assembly of FIGS. 1-3 taken at section line 4-4 in FIG. 2.

DETAILED DESCRIPTION OF THE PREFERRED EMBODIMENTS

"Tracked suspension" refers to a suspension for a vehicle configured to travel over the ground by the suspension repeatedly laying and lifting a recirculating track on which the vehicle rests and over which the vehicle travels.

"Front" or "forward" as used herein, mean the direction and/or location associated with the front end of the vehicle.

"Rear", "rearward", and "backward" refer to a direction and/or location associated with the rear end of the vehicle.

"Lateral and "laterally" refer to a direction and/or location of a vehicle that is perpendicular to the normal direction of straight forward vehicle travel and is directionally parallel to a ground plane.

"Lateral angle" as used herein refers to the angle of a surface of a structure as measured in a lateral direction and with respect to the ground. The lateral angle of the surface is an "outwardly descending" angle if the surface so described descends toward the ground as one travels along the surface laterally away from the structure.

"Longitudinal angle" as used herein refers to the angle of a surface as measured in a longitudinal direction and with respect to the ground. The longitudinal angle of the surface is a "forwardly descending" angle if the surface so described descends toward the ground as one travels forward along the surface.

"Track wheels" as used herein refer to any of the wheels that directly support, drive and or guide the track of a tracked suspension.

Figure 1:
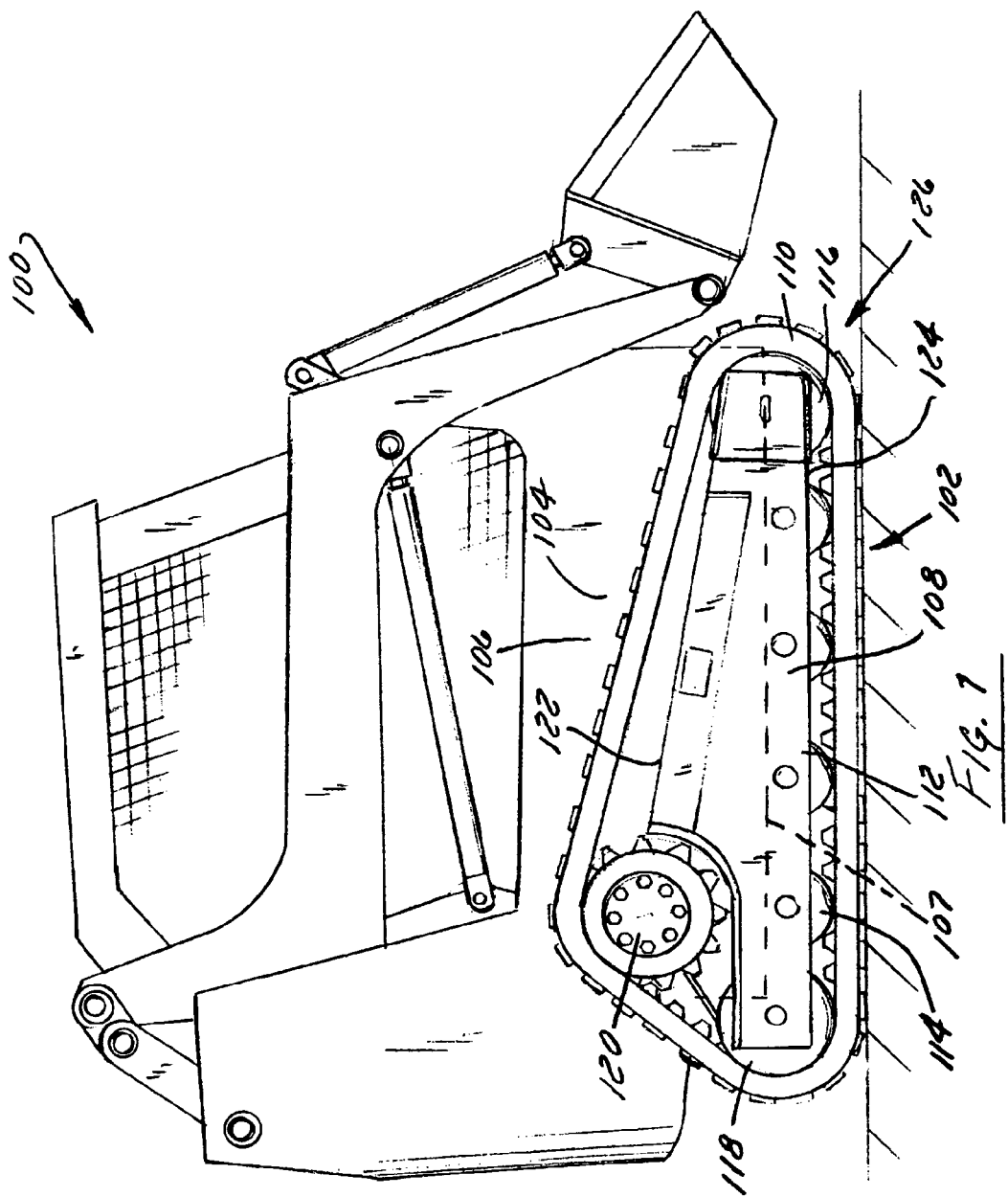
FIG. 1 is a side view of a tractor having left and right suspension beams in accordance with the present invention.

Refer now to the drawings and particularly FIG. 1 hereof, which illustrate a vehicle, here shown as a tractor 100, having left and right side tracked suspensions 102 in accordance with the present invention. Only the right side tracked suspension 102 is shown herein. The left side tracked suspension is identically arranged and is fixed in an identical manner to the left side wall (not shown) of the vehicle chassis.

The tractor 100 has a chassis 104 generally formed as a box comprising a left side wall and a right side wall that are opposing, vertically and longitudinally extending, and parallel; as well as a front wall and rear wall that extend laterally and generally vertically, and a bottom wall 107. Only the right side wall 106 (FIGS. 1 and 3) and bottom 107 (FIG. 3) are shown herein. The left side wall is identically arranged and is disposed along the left side of the tractor 100.

Tracked suspension 102 comprises a suspension beam assembly 108 and an endless track 110 that is supported by and extends around the periphery of the beam assembly 108.

Beam assembly 108 comprises an elongate suspension beam 112 that extends generally fore-and-aft and a plurality of track wheels that are fixed for rotation on the beam 112. These track wheels include four roller wheels 114 that are fixed to the bottom edge of the beam 112. Roller wheels 114 are disposed in a line and extend along the length of the beam. They are disposed inside the beam 112 itself. The wheels also include a front idler wheel 116 and a rear idler wheel 118 that are mounted on the front end and the rear end of the beam 112, respectively and are disposed (partially) within the beam 112 itself. The wheels also comprise a drive wheel 120 that is fixed to an upper portion of the beam 112. Drive wheel 120 extends above the top surface of beam 112 in order to support the track 110 in a spaced apart relation from the top surface 122 of beam 112. Similarly front idler wheel 116 extends both above the top surface 122 of beam 112, below the bottom edge 124 of beam 112 and forward of the front end 126 of beam to support track 110 in a spaced-apart relation from the top surface 122, bottom edge 124 and front end 126 of beam 112.

Referring now to FIG. 2, beam 112 is generally in the shape of an inverted "U", and comprises an inner wall 128, an outer wall 130, a yoke 132 fixed to the front end of the inner and outer walls, a curved rear plate 134 that is fixed to both the inner and outer walls, a front support 136 an a rear support 138 that fix the beam 112 to the chassis 104.

Refer now to FIG. 4, which shows the tops of the inner and outer walls 128, 130, in lateral cross-section. Walls 128,130 are bent toward each other and are welded together along a longitudinal joint to form the inverted U" shape.

The plate that forms outer wall 130 is formed with two bends including a first bend 140 (preferably of 45 degrees) that directs an upper portion 142 of wall 130 upward and inward, and a second, bend 144 (preferably of 45 degrees) that directs another upper portion 146 of wall 130 horizontally inward. These upper portions 142, 146 define first and second adjacent and abutting upper top surfaces on outer wall 130.

The first surface 148 is disposed at 45 degrees from the horizontal as measured in a lateral direction (FIG. 4) and at 5-20 degrees of the horizontal as measured in a longitudinal direction (FIG. 1).

Surface 148 is therefore disposed at a descending lateral angle preferably of 45 degrees (FIG. 4) and a descending longitudinal angle of 5-20 degrees (FIG. 1).

The second surface 150 is disposed at zero degrees with respect to the horizontal (FIG. 4) as measured in a lateral direction, and at 5-20 degrees of horizontal (FIG. 1) as measured in a longitudinal direction.

Surface 150 is therefore disposed at a descending lateral angle of zero degrees (FIG. 4) and a descending longitudinal angle of 5-20 degrees (FIG. 4), and preferably at the same longitudinal angle as surface 148.

The plate that forms inner wall 128 is formed with a single bend (preferably 90 degrees) that directs the upper portion 152 of wall 128 horizontally outward (FIG. 4). This bend forms an upper top surface of inner wall 128.

This upper top surface of inner wall 128 is disposed at zero degrees from the horizontal as measured in the lateral direction (FIG. 4) and at 5-20 degrees of the horizontal when measured in a longitudinal direction (FIG. 1), and preferably the same longitudinal angle as adjacent and abutting surface 150.

Portion 152 of inner wall 128 and portion 146 of wall 130 are preferably disposed in the same lateral and longitudinal angular orientations and are welded together thereby forming the single "U"-shaped member 112 (FIG. 4).

The rear portions of the inner and outer walls 128, 130 adjacent to the drive wheel are not bent together and welded, but are coupled together by curved rear plate 134, which is welded along its laterally facing inside edge 154 to the outer surface 156 of inner wall 128. The undersurface 158 of an outside lateral edge 159 of plate 134 is also welded to the rear top edge 160 of outer wall 130 Plate 134 extends outward slightly beyond the top edge 160 of outer wall 130 (best shown in FIGS. 3 and 6) to which it is welded, to permit the easy removal of dirt and other contaminants that may accumulate on top of plate 134 between the plate and drive wheel 120 (FIG. 3).

Plate 134 is positioned such that the axis of curvature 162 of plate 134 extends laterally and is coaxial with the axis of rotation of the drive wheel. The curved portion 164 of plate 134 defines a portion of a right circular cylinder 165 and preferably extends around the periphery of the drive wheels between 60 and 120 degrees, more preferably between 70 and 110 degrees, and more preferably between 80 and 100 degrees. The lower portion 166 of curved plate 134 is preferably planar and parallel to the ground. It comprises a slot 168 at its rear edge that is configured to receive the rear idler wheel 118. This slotted portion is disposed directly above rear idler wheel axle mounts 170 (FIG. 3) disposed on inner and outer walls 128, 130. A drive wheel mounting plate 169 has an opening 171 for mounting of a drive wheel and a curved edge portion 173. The drive wheel mounting plate 169 is coupled to the plate 134 such that the curved edge portion 173 extends along the curved portion 164 of plate 134 and that the drive wheel mounting plate 169 extends substantially perpendicular from the curved portion 164 of plate 134.

In a prior art arrangement, curved rear plate 134 was welded to the inside surface of outer wall 130 as well as to the inside surface of inner wall 128. In this configuration, curved plate 134 was recessed below the top edge of both the inner and outer walls, thereby forming the bottom of a shallow channel having inner wall 128 an outer wall 130 as channel walls. In the prior art arrangement this channel accumulated dirt.

Figure 5:
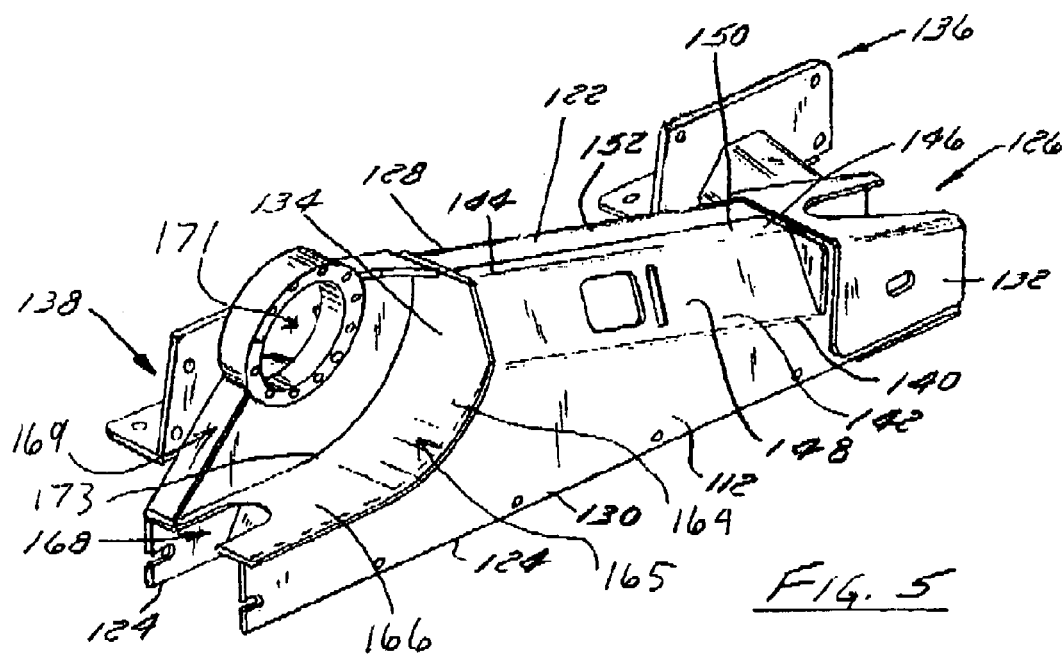
FIG. 5 is a rear perspective view of the right suspension beam of FIGS. 1-4.

Yoke 132 (FIGS. 2, 5) defines a vertical extending slot between two forwardly extending fork portions. The fork portions are configured to support front idler wheel 116 therebetween.

A spring 141 (FIG. 2) is disposed inside the forward end of beam 112. It is coupled to front idler wheel 116, pressing against it to apply outward pressure. This pressure tensions track 110 when it is in its operating position.

Figure 6:
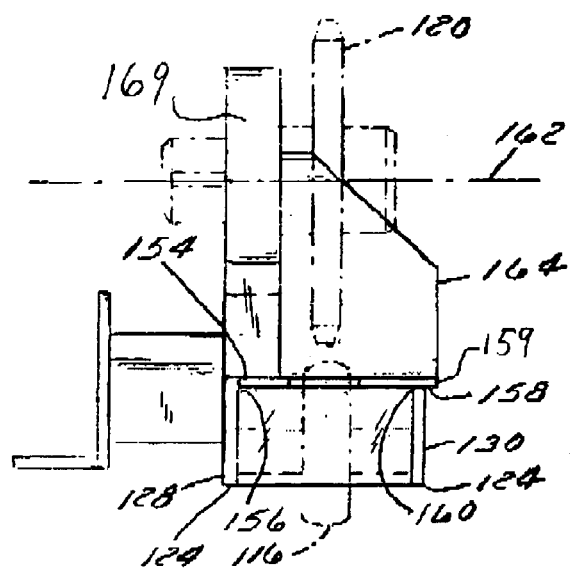
FIG. 6 is a rear view of the suspension beam of FIGS. 1-5.

Referring to FIGS. 3 and 6, rear support 138 is shown in a rear view. Rear support 138 comprises an angle bracket 172 which is configured to be bolted to the chassis of the vehicle. Support 138 also comprises a laterally extending beam member 174 that is fixed to bracket 172 at its inner end and is fixed to beam 112 at its outer end.

Referring to FIG. 4, front support 136 is shown in rear view Front support 136 comprises an angle bracket 176 which is configured to be bolted to the chassis of the vehicle in the same manner as bracket 148 172 of the rear support. Front support 136 also comprises a laterally extending beam member 178 that is fixed to bracket 152 176 at its inner end and is fixed to beam 112 at its outer end.

Supports 136 and 138 couple the suspension 102 to the chassis, supporting the vehicle and spacing the beam 112 a sufficient distance away from the chassis to insure track 110 does not interfere with the vertical side wall 106 of the chassis 104.

While the embodiments illustrated in the various drawings described above are presently preferred, it should be understood that those embodiments are offered by way of example only. The invention is not intended to be limited to any particular embodiment but is intended to extend to various modifications that nevertheless fall within the scope of the appended claims.

We claim:

1. An elongated beam assembly for a tracked suspension, the beam assembly having front and rear portions, the beam assembly comprising:

an inverted "U" shaped member, the inverted "U" shaped member further comprising generally vertical inner and outer walls, the inner and outer walls each having inner and outer surfaces, the inner and outer walls each having a top edge, the inner and outer walls are coupled together by a curved plate adjacent the rear portion, wherein the curved plate has a top and bottom surface and inner and outer lateral edges, wherein the inner lateral edge is coupled to the outer surface of the inner wall and the top edge of the outer wall is coupled to the bottom surface of the curved plate such that the outer lateral edge extends laterally outward beyond the top edge of the outer wall;

a plurality of track wheels coupled to the bottom of the member and disposed inside the member; and a drive wheel mounting plate having an opening for mounting of a drive wheel and a curved edge portion, the drive wheel mounting plate is coupled to the curved plate such that the curved edge portion extends along the top surface of the curved plate and that the drive wheel mounting plate extends substantially perpendicular from the top surface of the curved plate.

2. The assembly of claim 1, further comprising:
a track drive wheel supported on the member, wherein the curved plate is spaced apart from and curves around the periphery of the drive wheel.

3. The assembly of claim 1 wherein the plurality of track wheels are roller wheels, the beam assembly further comprising:
a front idler wheel fixed to a front end of the member and a rear idler wheel fixed to a rear of the member adjacent the rear portion of the beam assembly.

4. The assembly of claim 1, further comprising:
front and rear supports fixed to the member, the front and rear supports being configured to fix the member to a chassis of a tractor.

5. The assembly of claim 4, wherein each of the front support and the rear support further comprise:
a bracket configured to be fixed to a chassis side wall and to a bottom of the chassis; and
a beam fixed to both the bracket and the member, wherein said beam extends laterally outward away from the chassis to the member.

6. The assembly of claim 1, further comprising:
a track drive wheel fixed to the member, wherein the curved plate is spaced apart from and curves around the periphery of the track drive wheel.

7. The assembly of claim 1, wherein the curved plate defines an axis of curvature that is coaxial with a central axis of a drive wheel.

8. The assembly of claim 1 wherein a portion of the curved plate extends around a periphery of a drive wheel and defines a portion of a right circular cylinder.

9. The assembly of claim 1, wherein the plurality of track wheels are roller wheels, the assembly further comprising a front idler wheel fixed to a front end of the member and a rear idler wheel fixed to a rear of the member adjacent the rear portion of the beam assembly.

10. The assembly of claim 1, further comprising:
a front support and a rear support fixed to the member and configured to fix the member to a chassis of a tractor.

11. The assembly of claim 10, wherein each of the front support and the rear support further comprise:
a bracket configured to be fixed to a side wall and to a bottom of the chassis; and
a beam fixed to the bracket and to the member, wherein said beam extends laterally outward away from the chassis to the member.

12. The assembly of claim 10, wherein the outer wall has an upper portion bent to form a first upper surface, the first upper surface disposed adjacent the front portion at an outwardly descending lateral angle, the inner wall has an upper portion bent over to form a second upper surface that is horizontal when measured in a lateral direction, the second upper surface disposed adjacent the front portion.

13. The assembly of claim 12, wherein the second upper surface abutting the first upper surface over substantially its entire length, wherein the second upper surface is disposed at a forwardly descending longitudinal angle, and further wherein the first upper surface is also disposed at the forwardly descending longitudinal angle.

14. The assembly of claim 1, wherein the outer wall has an upper portion bent to form a first upper surface, the first upper surface disposed adjacent the front portion at an outwardly descending lateral angle, the inner wall has an upper portion bent over to form a second upper surface that is horizontal when measured in a lateral direction, the second upper surface disposed adjacent the front portion.

15. The assembly of claim 1, wherein the member comprises a first elongated and longitudinally extending top surface disposed at both a forwardly descending longitudinal angle of between 5 and 20 degrees, and at an outwardly descending lateral angle of between 40 and 50 degrees.

* * * * *